United States Patent [19]

Meyer

[11] Patent Number: 4,798,661
[45] Date of Patent: Jan. 17, 1989

[54] GAS GENERATOR VOLTAGE CONTROL CIRCUIT

[76] Inventor: Stanley A. Meyer, 3792 Broadway Blvd., Grove City, Ohio 43123

[21] Appl. No.: 715,749

[22] Filed: Mar. 25, 1985

[51] Int. Cl.[4] .......................... C25B 9/04; C25B 15/02
[52] U.S. Cl. ..................................... 204/228; 204/278; 204/DIG. 9
[58] Field of Search ......... 204/228, 278, 129, DIG. 8, 204/DIG. 9, 225

[56] References Cited
U.S. PATENT DOCUMENTS

| | | | |
|---|---|---|---|
| 3,954,592 | 5/1976 | Horvath | 204/129 X |
| 4,184,931 | 1/1980 | Inoue | 204/129 |
| 4,233,132 | 11/1980 | Carr et al. | 204/228 X |
| 4,316,787 | 2/1982 | Themy | 204/228 X |
| 4,394,230 | 7/1983 | Puharich | 204/228 X |
| 4,424,105 | 1/1984 | Hanson | 204/228 |
| 4,457,221 | 7/1984 | Geren | 204/DIG. 8 |
| 4,457,816 | 7/1984 | Galluzzo | 204/129 X |

OTHER PUBLICATIONS

*Scientific American*, Feb. 1987, "The Amateur Scientist," pp. 134–138, Jearl Walker, author.

*Primary Examiner*—Donald R. Valentine
*Attorney, Agent, or Firm*—Porter, Wright, Morris & Arthur

[57] ABSTRACT

A power supply in a system utilizing as a source of fuel a generator for separating hydrogen and oxygen gasses from natural water and having the capabilities to control the production of gasses by varying the amplitude of the voltage and/or the pulse repetition rate of the voltage pulses applied to a pair of plate exciters in a vessel of natural water, comprising a sequence of circuitry operative to limit the current of a d.c. potential to a minimum value relative to the magnitude of the voltage applied to the plate exciters. The circuits each function up to a given magnitude of voltage to inhibit and curtail the flow of electrons from the plate exciter having the negative voltage potential applied thereto. The first circuit operative from a first magnitude of voltage comprises converting the voltage potential applied to the plate exciters to a unipolar pulse voltage d.c. of a repetitive frequency. The next circuit varies the duty cycle of the unipolar pulse voltage d.c.; followed by rearranging the application of the voltage to the exciters to individual exciters each having the voltage applied thereto independently of the other plate exciters in the generator. The next circuit comprises an electron inhibitor that prevents the flow of electrons; the circuit being in the terminal line between the negative plate exciter and ground. In those applications of the generator wherein excessively high voltage is to be applied to the plate exciters for a very high yield of gasses, a second electron inhibitor of a unique structure is serially connected with the first electron inhibitor. The second named inhibiter having a relatively fixed value and the first inhibitor connected in series is variable to fine tune the circuits to eliminate current flow.

41 Claims, 9 Drawing Sheets a) HIGH GAS-YIELD
c) OFF STATE d) MAXIMUM GAS-YIELD a) HIGH GAS-YIELD b) LOW GAS-YIELD

PULSE VOLTAGE FREQUENCY GENERATOR

GAS GENERATOR VOLTAGE CONTROL CIRCUIT

BACKGROUND AND CROSS REFERENCES

The phenomena of physics was discovered that the hydrogen atoms in the water molecule will take on a positive charge whereas the oyxgen atom in the water molecule takes on a negative charge when the water molecule is exposed to an electrical voltage. The two hydrogen positive charged atoms and the one oxygen negative charged atoms, in magnitude, are in a state of equilibrium .

In my co-pending patent application, Ser. No. 302,807, now abandoned for Hydrogen Generator, the above noted principle of polarization is utilized. The simultaneous application of a positive voltage pulse to one plate exciter and a negative polarized voltage pulse to the other plate exciter in a vessel of natural water, will form polarized voltage electrical zones around the plates of a respective polarity. The positive voltage plate exciter zone attracts the negative charged atoms of the water molecule and the negative voltage plate exciter zone attracts the positive charged hydrogen atoms of the water molecule.

The opposing attractive forces causes the hydrogen and oxygen atoms to disassociate from the water molecule; and thereby, release the hydrogen and oxygen gasses.

In that natural water is utilized in the generator and that natural water contains a considerable percentage of ambient air, ambient air gas will also be released similarly to the oxygen and hydrogen gasses from the water molecule.

The above described process is apparently not a chemical reaction process such as in Faraday's Laws. In that process electrolyte is added to distilled water to draw current. The reaction of the electrolyte with that of the corrosive electrodes releases the hydrogen and oxygen gasses.

Characteristically, Faraday's Laws requires:

"The rate of deomposition of an electrolyte is dependant on current and independant of voltage. xxx will depend on current regardless of voltage, provided the voltage exceeds a minimum for a potential."

In the voltage dependant/current restricted process of my co-pending patent application, the disassociation of the hydrogen and oxygen atoms from the water molecule, is attributed to the physical force attraction of the polarized zones adjacent the plate exciters on the charged hydrogen and oxygen atoms having a polarity opposite to that of the polarized zone.

This physical force is exemplified in my co-pending patent application, Ser. No. 422,594, filed Sept. 24, 1982, now abandoned for Hydrogen Generator Resonant Cavity, wherein the principle of physics that physical motion of an element between spatially positioned structures will resonate if the distance between the structures, in wavelengths, is matched to the frequency of the force causing the physical motion, is utilized in a practical and useful embodiment. The d.c. voltage—with current restricted, applied to the pair of plate exciters spatially positioned in a vessel of natural water, is pulsed. The pulsing voltage on the plate exciters applying a physical force is matched in repetition rate to the wavelength of the spacing of the plate exciters. The physical motion of the hydrogen and oxygen charged atoms being attracted to the opposite polarity zones will go into resonance. The self sustaining resonant motion of the hydrogen and oxygen atoms of the water molecule greatly enhances their disassociation from the water molecule.

In my co-pending patent application, Ser. No. 411,977, filed Aug. 25, 1982, for Controlled Hydrogen Gas Flame, the gasses separated from the water, the hydrogen and oxygen together with the ambient air non-combustible gasses, are mixed as they are released by the generator. The mixture of gasses are collected in a pressure chamber in the generator and thereafter expelled through a nozzle having a port configuration with openings dependant on the mixture of gasses. The nozzle is connected directly to the collection chamber and ignited.

The gas mixture has a reduced velocity and temperature of the burning flame from that which would occur solely with a hydrogen and oxygen mixture. To further control the flame, there is added to the mixture other non-combusitble gasses in a controlled amount. Accordingly, the nozzle ports is related to the temperature and velocity of the flame. The several ports will accommodate flames of greater size without the danger of flashback or blowout such as would happen with a single flame.

This physical force is further demonstrated in the plate separation phenomena of the first aforementioned co-pending patent application. Simply, the closer the spacing between the plate exciters the greater the attractive force of the opposite polarity plate exciters on the charged hydrogen and oxygen atoms of the water molecule. With a given spacing, an increase in the magnitude of the voltage applied to the plate exciters will result in an increase in the rate of production of the gasses. With a voltage of a fixed amplitude a variation in the plate exciter spacing will affect the rate of production of the gasses. An increase in the spacing will result in less generation, whereas a decrease in the spacing of the plate exciters will result in an increase in gasses.

THEORETICAL ANALYSIS

The electrical phenomena of a positive potential voltage applied to one plate exciter and the application of a negative voltage potential applied to another plate exciter positioned in a vessel of water, may now be considered.

Distilled water, like air, having no conductive meduim, will inherently inhibit electron leakage. The magnitude of the applied voltage to the pair of plate exciters is correlated with the physical force on the electron movement. The magnitude of the initial force and the magnitude of the force to leak the electrons, and thereafter cause current flow, may be calculated or more readily empirically determined.

A small amplitude negative voltage applied to the negative plate exciter, will cause a physical disturbance to the movement of the floating electrons. However, the small amplitude voltage is insufficient to cause the electrons to leak and enter the attractive field force area of the positive plate. As the magnitude of the applied voltage is increased, the disturbance to the movement of the electrons is increased. With a further increase in the amplitude of the voltage applied to the plate exciters—to a limiting level, the resistance of the meduim to the attractive force of the opposite polarity exciter plate on the electron leakage will be overcome.

As the electron leakage enhances, the flow of the electrons to the positive plate exciter gradually increases as they enter the attractive field of the positive plate. Upon attaining a heavy flow of electrons reaching the positive plate attractive area, arcing will occur. An electrical arc is formed between the two plate exciters. When this occurs a direct short conductive flow of current will flow across the plates.

The electrical arc between the pair of plate exciters will form a direct line of conductivity; current will flow unrestricted. Upon the electron leakage attaining a direct short, the current is at a maximum. The voltage being subjected to the current takeover decreases gradually upon initial electron leakage and thereafter drops as the flow of electrons increases. When the electron leakage arcs over to the positive potential plate exciter, the voltage will drop to zero.

As stated above, the spacing between the pair of plate exciters in a vessel of water having a d.c. voltage applied, is correlated with the gas production rate. The closer the spacing between the pair of plate exciters, the greater the yield of gas generated. If the spacing of the pair of plate exciters is altered to a minimum spacing level, the attractive force of the positive polarity plate will overcome the resistance of the water meduim. Electron leakage will occur and from gradually to rapidly increase until arcing between the pair of plate exciters forms a direct path and consequently a direct short.

The distance between the plates and the amplitude of the voltage applied, each independantly affect the other. The two variable factors are interrelated; the one being variable relative to the other. The spacing being inversely proportional to the amplitude of the voltage.

SUMMARY OF THE INVENTION

In the utilization of a generator for the separation of the hydrogen and oxygen gasses from water; and wherein the production of the gasses is varied by varying the amplitude of the voltage and/or the pulse rate—duty cycle of the pulsed d.c. voltage applied to the plate exciters in a vessel of water: the present invention comprises a power supply with the applied voltage to the pair of plate exciters variable from zero upward to extremely high voltages; but yet, that inhibits the electron leakage.

The power supply of the present invention includes circuitry for an increased production of the generation of the gasses through varying the amplitude of the voltage applied to the plate exciters. The circuitry includes means and components for restriction of the electron leakage (current flow).

The applied voltage to the pair of plate exciters is a unipolar pulse d.c. voltage of a repetitive frequency. Alternate power circuitry is utilized. In the first embodiment the input voltage is alternating current fed to a bridge rectifier; whereas in the second preferred embodiment, the input voltage is direct current applied to the primary of a rotating field secondary winding.

With a very low level of amplitude of the voltage applied to the plate exciters, no electron leakage from the negative potential plate exciter to the positive potential attractive field will occur. An amplitude of the voltage above a first forceful level will cause electron leakage. The circuitry of the invention overcomes the electron leakage with the application to the plate exciters the aforesaid pulsed d.c. voltage.

An increase in amplitude of the applied voltage above a second level, will result in electron leakage.

To obtain additional gas production without electron leakage, circuitry in the power supply prevents electron leakage by varying the duty cycle of the pulsed d.c. voltage applied to the plate exciters. The varying levels of amplitude of the duty cycle pulses effectively restrains the electrons from the B+ attractive field.

The pulsating d.c. voltage and the duty cycle pulses have a maximum amplitude of the level that would cause electron leakage. Varying of the amplitude to an amplitude of maximum level to an amplitude below the maximum level of the pulses, provide an average amplitude below the maximum limit; but with the force of the maximum limit.

In most instances of a practical application of the hydrogen and oxygen generator the pair of plate exciters will be several pairs connected in parallel. There will be one terminal to the positive voltage and another terminal to the negative voltage. A further expediency to eliminate electron leakage is attained by eliminating the large surface area probability of stray electrons.

It is noted that the first two circuit components and the multiple connections for restricting electron leakage relates to the plate exciter having the negative voltage applied thereto. That is the circuitry overcomes the attractive force of the B+ potential field. Additional circuitry is provided for very high yield gas production above the aforesaid upper limits, in the negative applied voltage plate exciter.

A circuit is included in the negative plate exciter that practicaly eliminates electron flow; that is, the electrons are prevented from reaching the negative plate exciter and thereby eliminating the affect of the attractive force of the B+ field. A current limiting resister connected between the negative plate exciter and ground, prevents current flow—electron leakage to the the opposite polarity field.

The circuit comprises a limiter resistor connected between the negative plate and ground that blocks current flow—electron leakage to the negative plate. The practical elimination of the current has no affect on the voltage, in the preferred embodiment, since there is no voltage drop.

In a sophisticated embodiment, the limiting resistor comprises a unique structure of poorly conductive material having a resistive mixture sandwiched therebetween. A second resistor of the variable type is serially connected to the unique limiter for tuning. The value of the limiting resistance is determined by the current passing therethrough. The variable is employed until the ammeter reads zero or close to zero as possible.

The sandwich type limiter is varied in value by controlling the mixture of resistive material to binder.

The circuitry and expedients to inhibit the electron leakage at all levels of the magnitude of the voltage applied to the plate exciters is equence of steps and functions operable from predetermined circuit components. The order of the circuit functions is set and preferably not altered; however, each of the specific variables can be varied independantly and varied with interrelated function to the other.

The phenomena that the spacing between two objects is related to the wavelength of a physical motion between the two objects is utilized herein. A relatively small increase in amplitude will yield an output several magnitudes greater when the motion of the water molecule is moving to and fro with a repetition rate to match the resonant length of the spacing between the pair of exciters.

OBJECTS OF THE INVENTION

It is a principle object of the present invention to provide a power supply for a hydrogen and oxygen gas generator wherein varying the voltage amplitude varies the rate of generation of the gasses generated.

Another object of the present invention is to provide such a power supply that includes circuitry to permit voltage to be varied in amplitude with current restrict to a minimum relative to the amplitude of the voltage.

A further object of the present invention is to provide such a power supply for a hydrogen and oxygen generator wherein the electron leakage between the plate exciters is inhibited.

A further object of the present invention is to provide a power supply for a hydrogen and oxygen generator including circuitry for a unipolar pulse d.c. voltage of a repetitive frequency from either an alternating or a direct current input.

Still another object of the present invention is to provide a power supply having varying levels of voltage indicative of varing levels of gas generation that is programmable with a utilitarian device, particularly, when the generator has exciters spaced a distance in wavelength matched by the voltage pulse frequency.

Further objects and features of the present invention will become apparent from the following detailed description when taken in conjunction with the drawings in which:

DETAILED DESCRIPTION OF THE INVENTION

Figure 1:
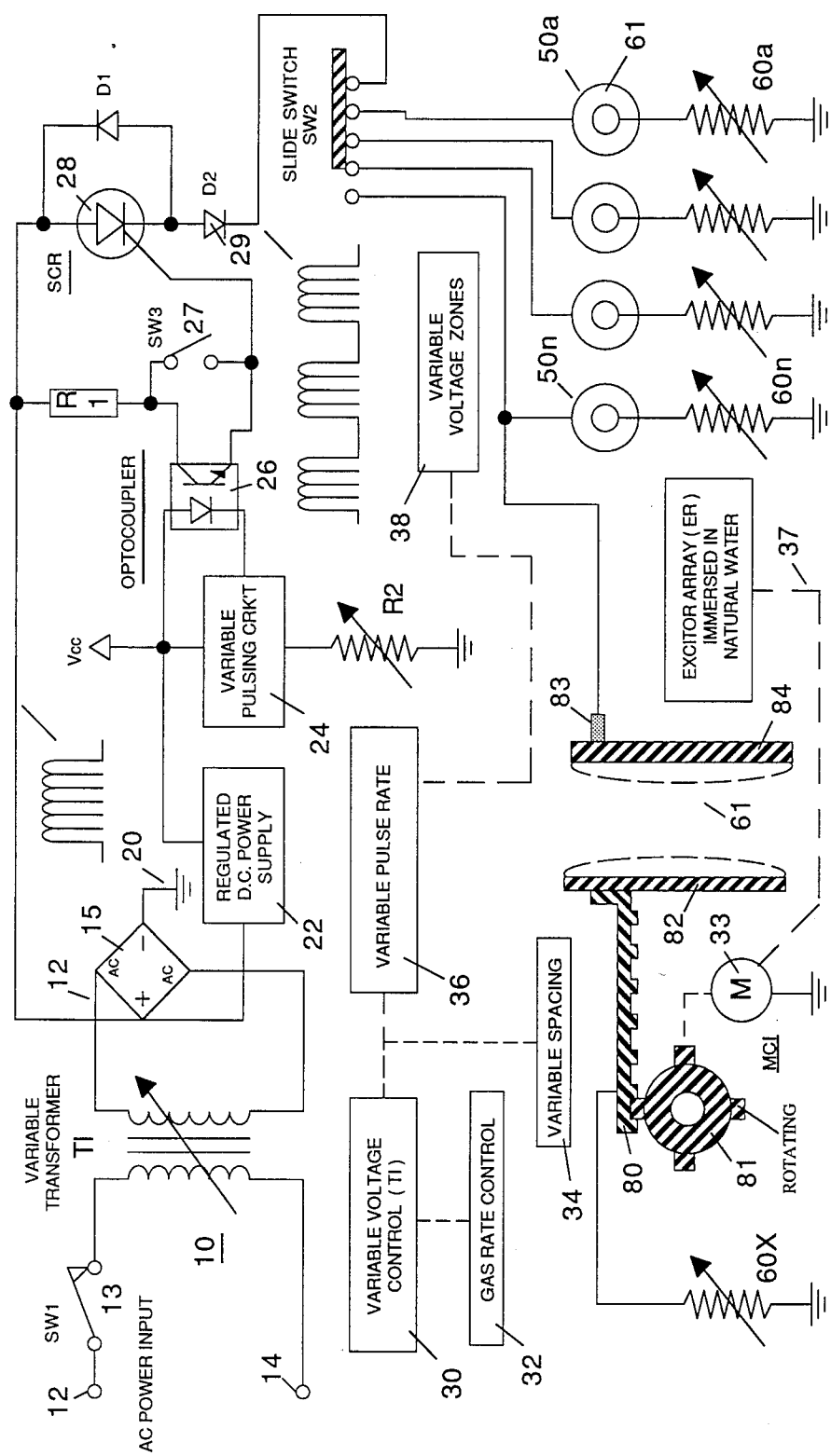
FIG. 1 is an overall illustration of the present invention in a preferred embodiment; the components shown partly in blockschematic and partly pictorially.

Referring to the drawings and in particular to FIG. 1, there is illustrated the present invention in its preferred embodiment of a power supply for the aforementioned hydrogen and oxygen gas generator, providing variable amplitude voltage with inhibited electron leakage.

The alternating current rectifier circuit 10 comprises input alternating current terminals 12 and 14. Switch 13 is a typical on/off switch. Transformer 10 is an inductive primary and secondary transformer connected to a bridge rectifier 15. The inductive field 11 of the transformer 10 is variable in a known manner to yield a variable frequency alternating voltage/current to the primary winding.

The bridge 15 arms are connected across the input of the secondary winding of the transformer 10. The upper and lower arms are connected across the extreme ends of the secondary winding and the left hand arm is connected to the output of the rectifier 15. The right arm is connected to ground 20. The rectifier inverts the negative swing of the alternatng current and thereby results in an output voltage pulse of a frequency twice that of the input frequency of the alternating current voltage applied to the terminals 12 and 14.

It is appreciated that if the alternating current voltage is varied in frequency by the variable inductive field 11, the output frequency across the bridge 15 will still be twice the frequency of the alternating voltage across the secondary of the transformer secondary winding 10.

As noted in the aforesaid co-pending patent application, the rate of generation of the gasses is directly related to the amplitude of the applied voltage to the pair of plate exciters.

The power supply of FIG. 1 includes a variable circuit 30 for varying the amplitude of the rectified voltage by rectifier 15. The variable voltage circuit, in turn, is directly controlled by the gas rate function separately, sequential, and together with the phenomena of a reseonant cavity.

The waveform output of the bridge is shown as a unipolar d.c. voltage pulse of a repetitive frequency (hereinafter referred to as a d.c. voltage). It is noted that the pulse voltage is not filtered and the plate effect is utilized.

As stated, a voltage with an amplitude below the minimum level for example, with a given size apparatus, 2.5 volts (L-1 of FIG. 8) when applied to the pair of plate exciters, is insufficient amplitude to force the electrons to leak from the negative plate exciter. The hydrogen and oxygen gasses will be separated from the water at the low level of voltage amplitude; and the gasses generated will also be at the minimum.

Above the minimum level (L-1 of FIG. 8) of amplitude, the applied voltage will have a sufficient force to agitate and cause movement of the electrons around the negative plate exciter. As a consequence electron leakage would take place.

To overcome the forceful effect on the electrons around the negative plate exciter, but apply a voltage of increased amplitude for an increase in gas production, the first step in a sequence is utilized. The pulsed d.c. voltage having a frequency predetermined by the input alternating current to the transformer 10, is applied to the plate exciter.

The maximum amplitude of the d.c. voltage pulse is sufficient to cause an increase in gas production; however, the minimum amplitude of the pulsed d.c. voltage is insufficient to cause electron leakage. The average of the maximum and the minimum results in an increase gas output but without electron leakage.

The physical force on the movement of the electrons around the negative plate exciter is further controlled in specific situations by varying the frequency of the pulsed d.c. voltage. The frequency of the pulsed d.c.

voltage may be altered by an alternating current of another frequency applied to the input terminals 12 and 14. Alternatively, the frequency of the pulsed d.c. voltage may be varied as shown by the variable transformer 10 winding 11.

Figure 3:
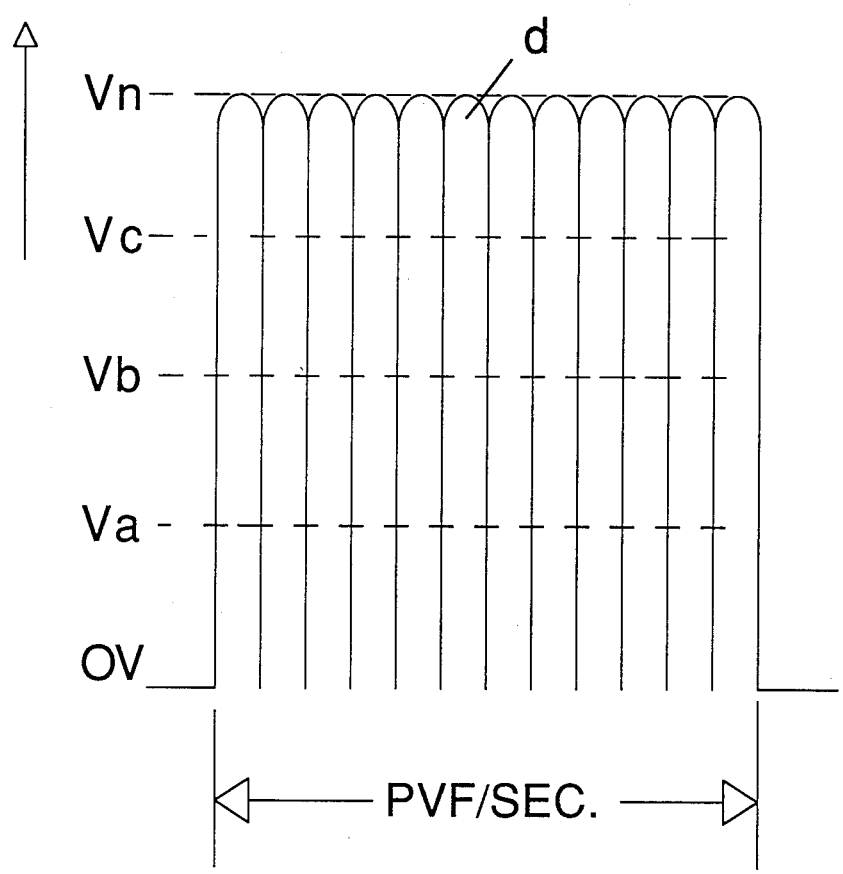
FIG. 3 illustrates the unipolar pulse voltage with a continuous repetitive frequency.

With reference to FIG. 3, the unipolar pulsed d.c. voltage of a constant frequency is illustrated. In the first mentioned variation of the amplitude of the pulsed voltage, there is further shown in FIG. 3 voltage levels from 0V, Va xxx Vn. As noted below a variation of amplitude above the predetermined levels will permit electron leakage.

Figure 8:
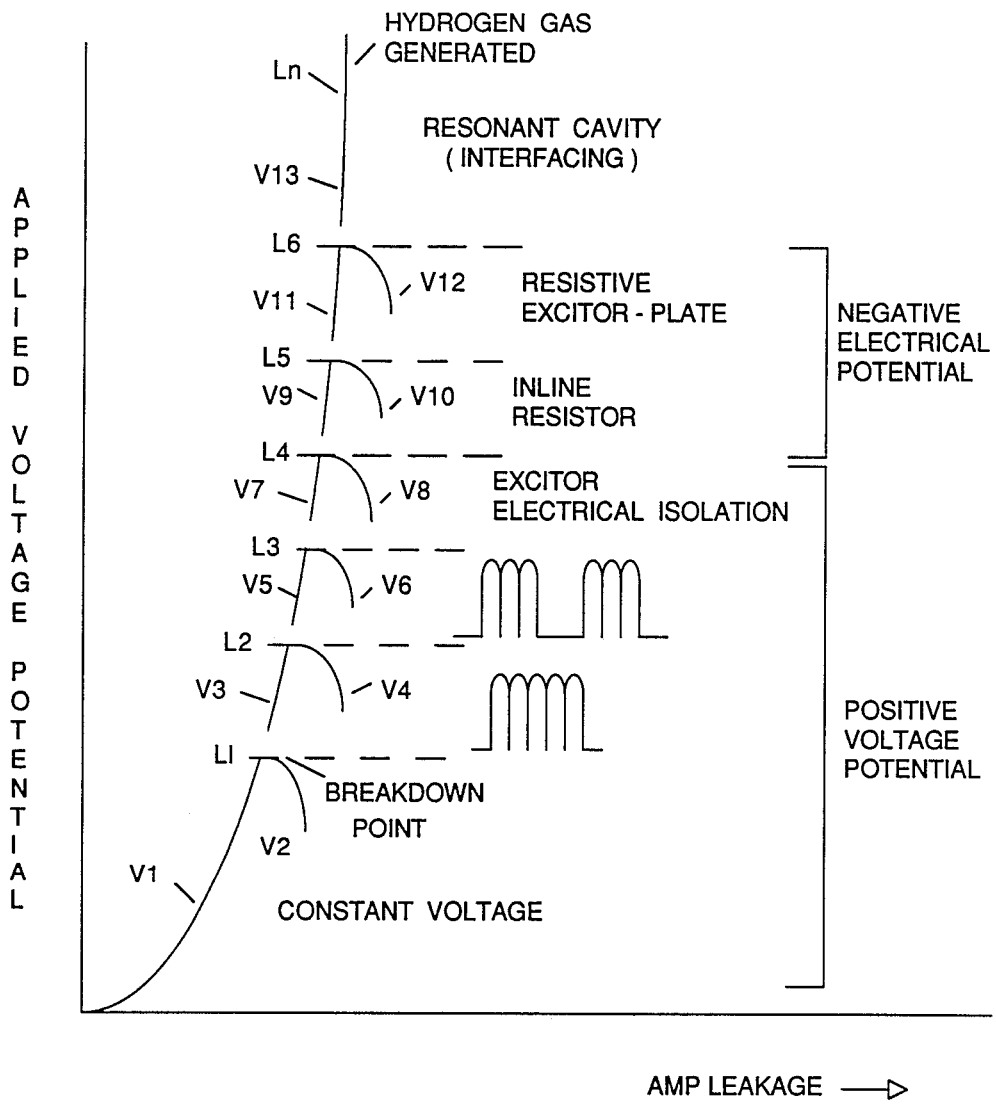
FIG. 8 is a graphical illustration of the varying limitations of voltage amplitude for inhibiting electron leakage.

Refering to FIG. 8, there is illustrated an appreciation of the significance of electron leakage. Initially it is to be noted that the first amplitude level, L-1, is when electron leakage occurs. Prior to leakage, voltage $V_1$ increases on demand. At the level L-1, when leakage occurs, current begins to flow and as a consequence the voltage $V_2$ begins to drop. The current flow increase is proportional to the voltage decrease; and upon arcing, a dead short condition for current takeover, the voltage $V_2$ drops to zero.

The same rise and fall in amplitude of the voltage versus current flow repeats at amplitude levels L-2. L-3, L-4, and L-5; again, in a given size apparatus, voltages of 4, 5.5, 7, and 8.5.

It is seen then, that it is paramount that electron leakage must be curtailed when the operation of the system is dependant on voltage, such as the generator utilized herein.

Returning to the overall circuit of FIG. 1, the unipolar pulsating d.c. voltage is an improvement in raising the amplitude of the voltage without electron leakage. Unfortunately, it too, has a voltage amplitude limit of 4.0 volts as shown by L-2 of FIG. 8.

Figure 2:
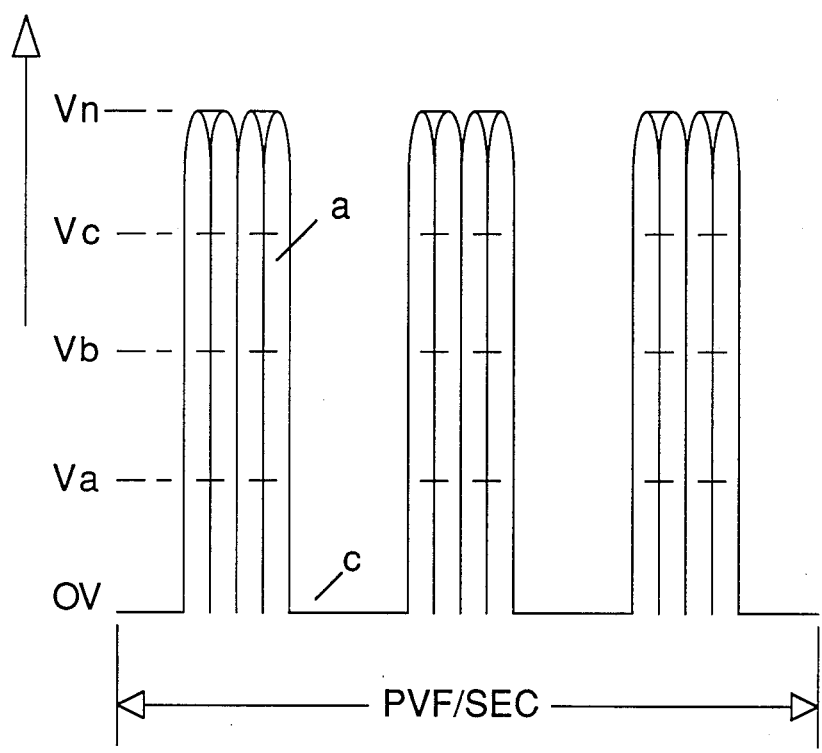
FIG. 2 is a first waveform illustrating the unipolar pulse d.c voltage of repetitive frequency with a uniform duty cycle.

To further restrict current flow with amplitude voltages above the level L-2 of FIG. 8, electron leakage is inhibited from the exciter plate having the negative voltage applied thereto, by varying the duty cycle pulse of the pulsed d.c. voltages as shown FIGS. 2, 3, and 8. In an initial application the pulsed d.c. voltage is switched on and off for equal periods of time.

With reference again to FIG. 1, the variable pulsing circuit comprises an electronic switch SCR 28 operable from one state to another form the optocoupler timing circuit 26. The operation and of the pulsing of a voltage is within the state of the art.

Diode 29, a blocking diode, is operable in the accepted manner to eliminate stray electrons, shorts, variances, spurious signals, and the like. In addition the diode 29 blocks the back-electromagnetic force.

The pulsing of the pulsed d.c. voltage, as shown by the waveform of FIG. 2, comprises switching, via trigger circuit 26, the pulsed d.c. voltage on an off—in a first instance. As will be understood below relative to the programming circuit of FIG. 6, the time period of the pulses may be varied periodically or aperiodically, the duration of the on/off period may be varied, the gradient level of the on/off pulses may be varied, and all of the above may be interrelated into a sequence of duty pulses with the varying conditions all as shown in FIGS. 4, 4A, 4B, and 4C.

The duty pulses are effective much in the same manner as the pulsed d.c. voltage pulses in the function of inhibiting electron leakage. The "second" series of force on the electrons around the plate exciter, having the negative potential voltage applied, in terms of voltage amplitude is greater. However, the greater amplitude is averaged by the double pulses to an effective voltage of an amplitude to inhibit electron leakage.

As previously stated, the voltage pulses applied to the plate exciters further enhance the rate of generation of the gasses. Accordingly, to achieve the most effective relationship between gas generation and current limiting, the voltage amplitude is interrelated to the pulse repetition rate of the duty pulses in FIG. 1. Also, the rate of production is related to the frequency of the unipolar d.c. voltage, the frequency then should be interrelated to the duty cycle pulses.

With continued reference to FIG. 1, mechanical switch 40 is a known means for applying the voltages to the plate exciters individually and sequentialy. The negative plate exciter is the center conductor of an inner and outer arrangement. The negative plate exciter is connected to ground 20; ground 20 being the power supply ground.

The dual pulses comprised of the freqeuncy repetitive pulses and the duty cycle pulses similarly to the previous configuration. The amplitude is effective to increase the output gas generation with an upper limit of 5.5 volts, in this instance L-3 of FIG. 8.

In a typical configuration of the hydrogen generator of the aforementioned co-pending application, the plate exciters will comprise a plurality of pairs. In the previous configurations the positive voltage was applied in parallel to all the inner plates; whereas the negative voltage was applied to all of the inner plate exciters in parallel. It has been found that an increased surface between the inner and the outer plates will increase the probability of an electron breaking free and leaking to the attractive field of the positive voltage plate. The surface leakage has been eliminated by applying separately and individually the positive voltage to each of the outer plate exciters and the negative voltage to each of the inner plate exciters.

With reference to FIG. 8 again, it is seen that although the serially connected exciter plates do permit a higher amplitude of voltage to be applied, it too, has a limitation L-4 of 7 volts.

Figure 5:
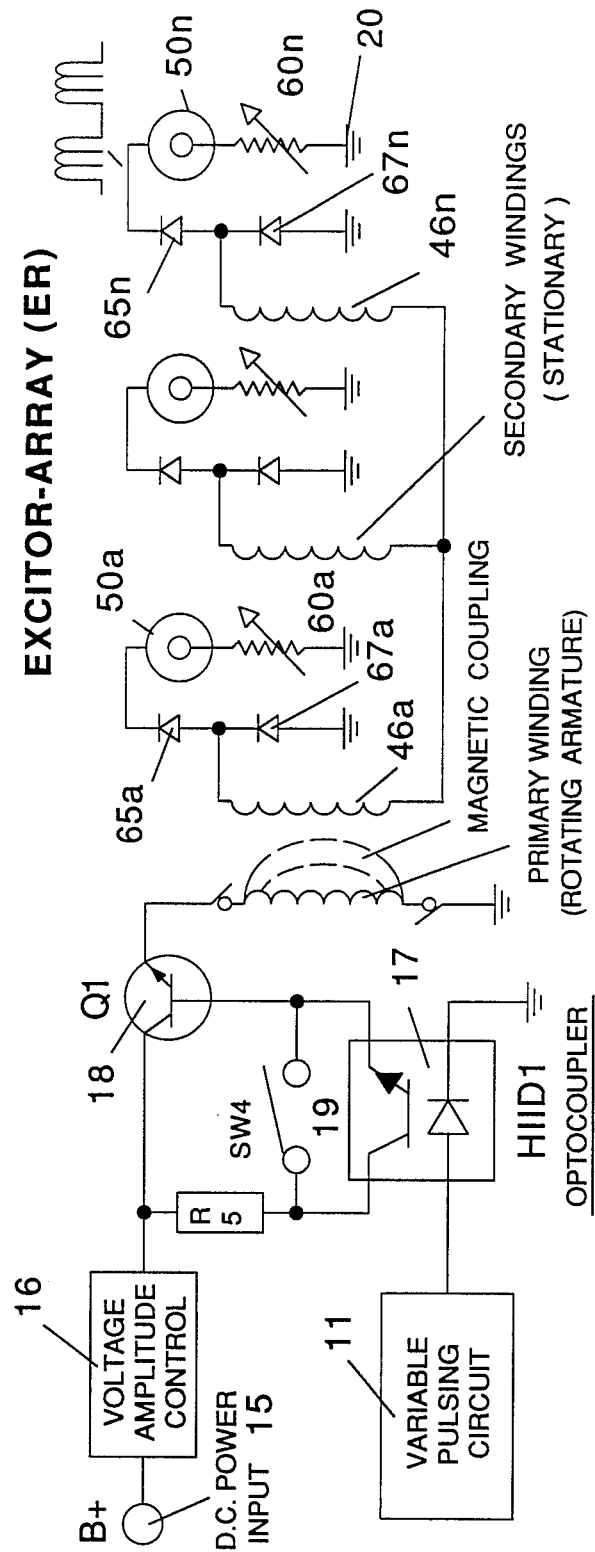
FIG. 5 illustrates partly schematic and partly in block the pulse frequency generator from a direct current voltage source.

The next expediency in the sequence for inhibiting electron leakage is the current inhibitor resister 60 as shown in FIGS. 1 and 5. The circuit 60 comprises a simple resistor of the commercial type or specially made for the particular application. The resistor is variable to provide fine tuning of the electron inhibiting. In that the each pair of plate exciters are connected separately, a resistor 60a xxx 60n is connected to each of the plates having the negative voltage connected therto. In this embodiment the inner plate of the exciters 50a xxx 50n. In that the inner plate had been normally connected to ground, the resistive element is now connected between the inner plate and ground.

As known in electrical art the resistor will provide a complete block to electron leakage—current flow. However, since the resistor 60 is connected from ground-to-ground there is no real affect on the voltage; and since there is no connection with the positive side there is no voltage drop.

The electron leakage resistor will again raise the upper limit of 8.5 volts amplitude before breakdown as shown at L-5 of FIG. 8. In the generation of the hydrogen and oxygen gasses to an infinite limit, as yet not fully appreciated, the upper level of amplitude of the voltage is removed with the utilization of the electron inhibitor of FIG. 7.

In this embodiment of the current inhibitor connected to the inner plate having the negative voltage applied thereto, comprises a stainless steel sandwich 70/74 with a resistive material therebetween. The stainless steel is a poor conductive material and hence will restrict to some extent the electron flow. Other poor conductive material may be utilized in lieu of the stainless steel. The electron inhibitor 70/74 is connected in the same manner as resistor 60—between the inner plate having the negative potential connected to it and ground.

The resistive value of the electron inhibitor 70/74 is chosen empirically to a closest value, thereafter the total value of the resistance is fine tuned by the resistor 75 connected serially between the inner plate and ground.

To alter the resistive value of the electron inhibitor 70/74, the resistive material 72 comprising a mixture with a binder is altered in the percentage of resistive material to binder.

With reference to FIGS. 1 and 8, the pulse d.c. voltage of a repetitive frequency and the duty cycle pulses, together with the serially connected plate exciter techniques in the sequence for limiting the electron leakage is in relation to the positive exciter outer plate. The current inhibitor resistor 60 and the current inhibitor resistor 70/74 are in the negative voltage line connected to the inner plate.

With particular reference now to FIG. 5, there is illustrated an alternative embodiment for derivint the unipolar d.c. voltage pulse of a repetitive frequency—similar to that of FIG. 1. The distinction in the embodiment of FIG. 5 is that the input voltage is a direct current in contrast to the alternating current of FIG. 1.

In operation of the circuit of FIG. 5, a low voltage, such as from a battery, is applied to the primary winding to the circuit of a rotating field. The primary winding 42 being the rotating field has it opposite end connected to ground. As the field of the primary winding 42 rotates, there is induced three pulses at the output of each of the three secondary windings 46a 46b, and 46c.

The repetition of the triple pulse is once per each revolution; hence the number of pulses per given period of time is related to the speed of rotation of the rotating field. A faster rotation will produce a greater voltage frequency. An increase in the number of secondary windings will result in an appropriate increase in the number of pulses; whereas an increase in the number of turns on the secondary windings will increase the amplitude of the pulses. The alternating voltage output of the three secondary windings is converted into pulses by the conventional diode rectifiers 65/67 bridge circuit for each of the separate pairs of exciter plates 50a–50n. In this way a constant unipolar pulsating d.c. voltage of a repetitive frequency similar to that of FIG. 3 is applied to each of the exciter plates 50a xxx 50n. The output is similar to that derived from the alternating voltage input of FIG. 1. The d.c. voltage is a constant voltage pulse.

Again similar to FIG. 1, there is provided a timed pulsing circuit comprised of a timer 17, switch 19, and transistor 18. Initially, the d.c. pulse voltage is switched on and off, to provide a constant share time duty cycle to the primary winding 42 of the rotating field. In the off period there will be no voltage on the primary winding 42, and hence, no voltage output on the secondary winding 46.

The circuit of FIG. 5 is especially economical in that extremely low amplitude voltages (0–5 volts) is applied to the primary 42. At this low level, the current is negligible and power consumption is minimum. The output voltages from the secondary windings 46 is relatively high and is in the order of two hundred volts. The output voltages from the secondary windings 46 are variable in amplitude by the resistor 16 in the input circuit. A very small increment of input voltage results in a much greater output.

The sequence of circuitry of the pulsed d.c. voltage, duty cycle pulses, serially connected exciters, resistor in the ground line, and the plate resistor are each, and together, effective to eliminate electron leakage. The conditions set forth, in each instance were under actual conditions—with distilled water.

In the basic process of water separation as herein utilized, the hydrogen and oxygen gasses are separated by the application of a voltage to the plate exciters with the attendant current as close to zero as possible. Accordingly, the use of natural water having contaminents is equally operable; the contaminents will have no affect upon the separation of the hydrogen and oxygen atoms from the water molecule; nor will the contaminents have an affect on the plate exciters such as fouling up.

With the use of certain natural waters particularly sea water with a salt content or natural water with an iron or other mineral content, the natural water would have a tendancy to draw current. The passing of current as set forth above, would cause the voltage to drop and basically would curtail the operation of the generator.

The resistor 60 of FIGS. 1 and 5, connected between the exciter plate having the negative voltage applied thereto and ground is an effective current limiter/electron inhibiter. In simple terms the restriction to current flow to the negative plate is a restriction to the flow of current between the pair of plate exciters. There can be no electron leakage from the negative potential plate exciter if there are no electrons to leak.

Figure 7:
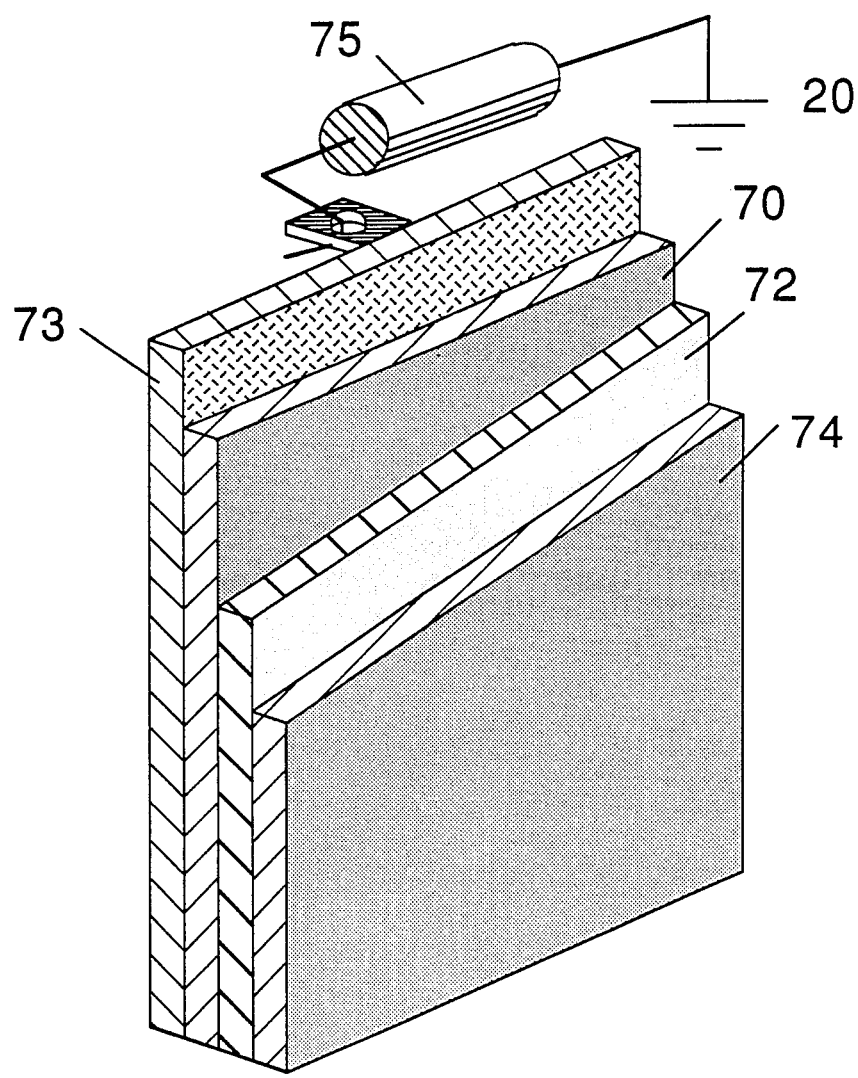
FIG. 7 is a crossectional perspective of a multiple layer sandwich resistive element for inhibiting electron leakage.

The resistor 60 of FIGS. 1 and 5, and especially when taken together with the resistive plate structure of FIG. 7, current is eliminated from the plate exciters.

In FIG. 1 there is illustrated an alternative manner of varying the rate of separation of the hydrogen and oxygen gasses from water. As fully disclosed and described in the aforesaid copending application Ser. No. 302,807, the spacing between the plate exciters in water is directly related to the rate of separation of the hydrogen and oxygen gasses.

The plate exciters 82 and 83 positioned in water 61 are varied in spacing by the rack 80 and gear 81. The variations can be manually or through the programmer 69 for predetermined gas rate generation. The programmer actuates line 37 to the motor 33 to drive the gear 81.

The closer the spacing the greater the gas yield, i.e., the attractive force of the electrical voltage zones is related to spacing. However as noted above, the closer the spacing the greater the probability of spurious electron leakage. It is appreciated the optimum is the closest spacing for gas generation with a minimum of current leakage.

The pulsed d.c. voltage, the duty cycle pulses, the resistor from negative to ground, the serial connections of the exciters, and the plate resistor in series with a variable resistor between the negative plate and ground, is a sequence of circuits that conteract the electron leakage with increased voltage. Similarly, the same sequence individually and in combination are equally applicable with respect to the variation of plate spacing to vary the rate of generation of the gasses but yet, to restrict electron leakage. The voltage levels from 0 volts upward will be dependant on the physical parameters of the apparatus. In one typical structure of the apparatus the voltage was varied from zero (0) volts to 45 volts. In a smaller structure, the voltage levels of FIG. 8 were utilized.

With reference again to FIGS. 2, 3, 4, 4A, 4B, 4C, and 4D, the waveforms illustrated therein depict the several variations of the pulsed d.c. voltage relative to the duty cycle pulses. Initially, each of the two set of pulses are varied individually. The on/off time of the two sets of pulses in a first instance is uniform. Then the timing of one or the other is varied; the gradient levels of the voltages are varied periodically and a periodically, pulse duration is varied equally and unequally.

To attain the optimum gas generation with minimum electron leakage, is determined empirically with a gas flow meter and an ammeter. The variables are interrelated but not necessarily having the effect on either gas production or electron leakage. Practical training reduces the tune-up period.

Figure 6:
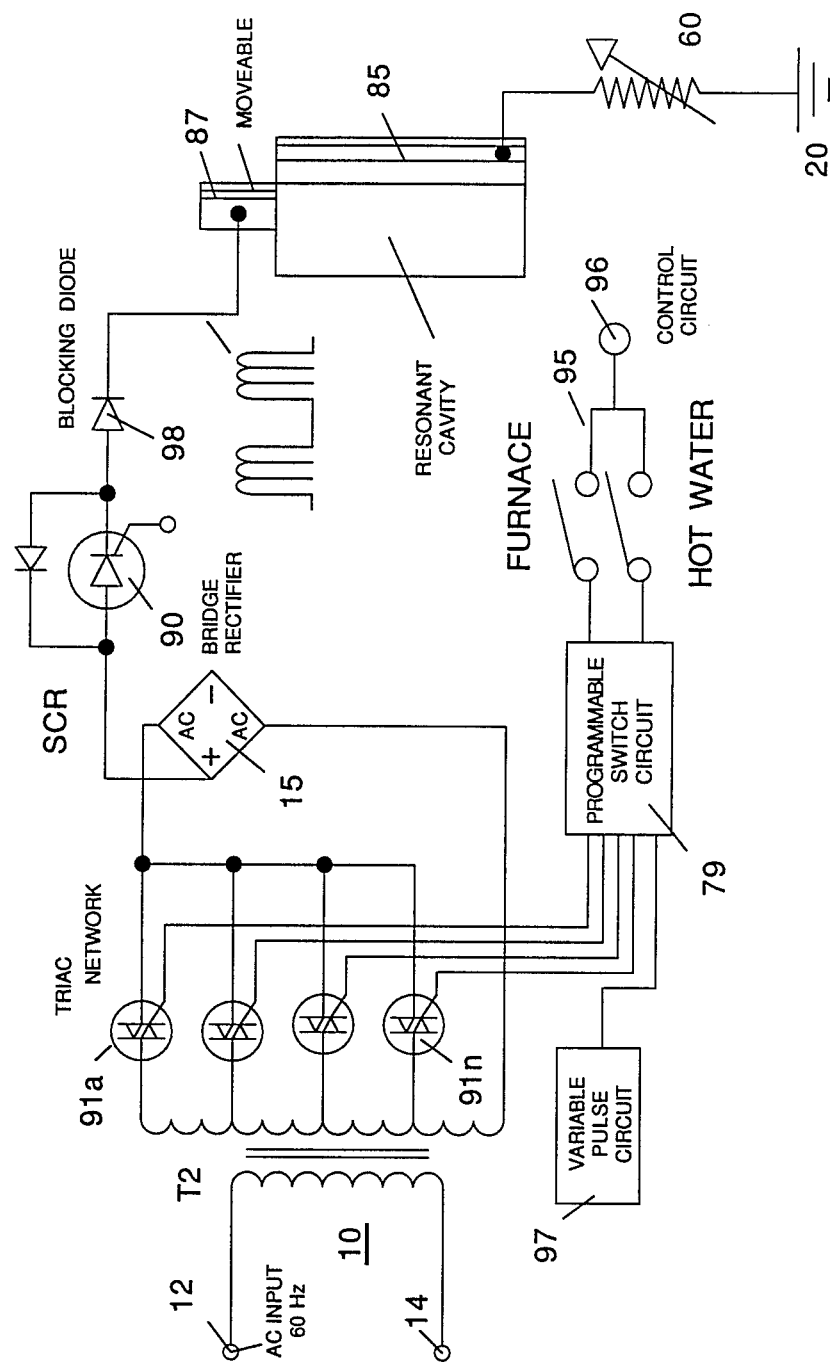
FIG. 6 is a schematic of the circuitry for programming the varying levels of voltage to practical applications.

In FIG. 6, there is illustrated the resonate cavity of my aforesaid co-pending patent application Ser. No. 422,594. The resonant cavity described and disclosed therein, is a result of the discovery that when the distance between two stationary bodies is equal in wavelength to the frequency of the movement of an object going back and forth therebetween, the movement of the object will go into resonance. The motion is greatly enhanced and with a repetitive sustained force. The principle applied to the hydrogen and oxygen gas generator of the present invention results in the movement of the water molecules and the atoms to an attractive field will be greatly enhanced when the frequency of the back and forth movement is matched to the wavelength of the distance between the pair of plate exciters.

The amplitude is increased to the minimum for resonance. The voltage amplitude thereafter is maintained at the minimum and raised from the minimum for an increase in gas generation. The minimum is the lower gradient level illustrated in the waveforms of the figures. Since resonance is a matter of matching a physical distance with frequency of the back and forth motion over that distance, matching the particular frequency to the particular wavelength, can be with either d.c. voltage pulses or the duty cycle pulses.

Figure 4:
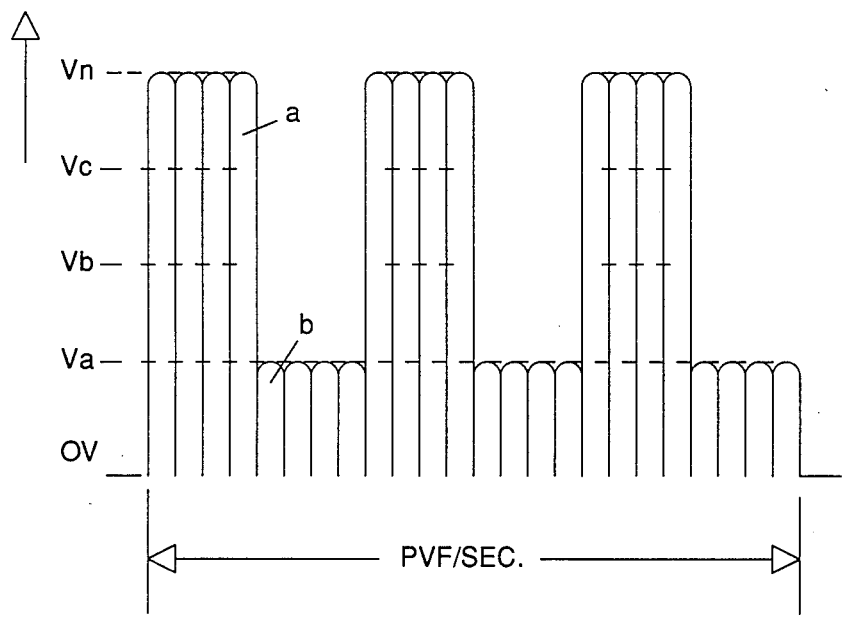
FIG. 4 illustrates the unipolar pulse voltage of a repetitive frequency having a uniform duty cycle from a low gradient level to high gradient level.

The resonant cavity is depicted in FIG. 4 pictorially. It is understood that the exciter plates 50a–50n of FIG. 1 become resonant cavities by matching the distance between the exciters to a pulse frequency of the same wavelength.

Figure 4A:
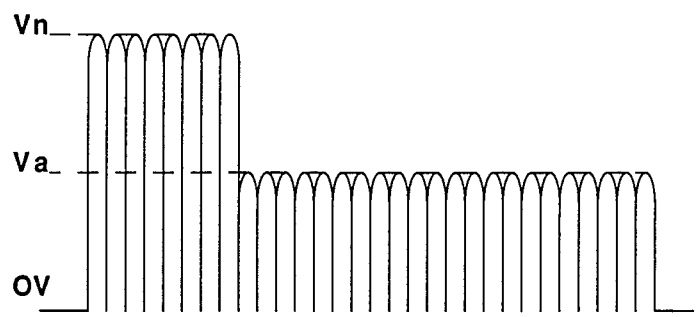
FIG. 4A illustrates the duty cycle as being non-uniform and between gradient levels; FIG. B illustrates the duty cycle comprising varying gradient levels and of non-uniform repetition.
Figure 4B:
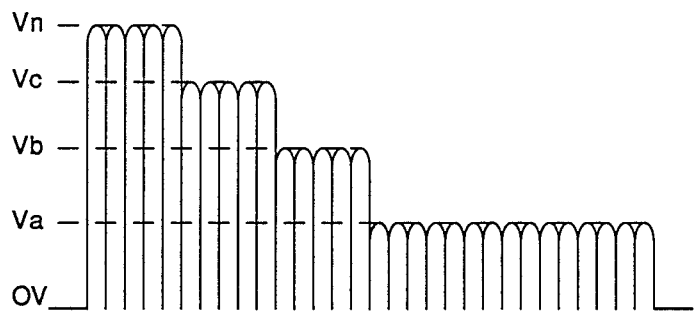
FIG. 4C illustrates the varying gradient levels as being uniform.
Figure 4C:
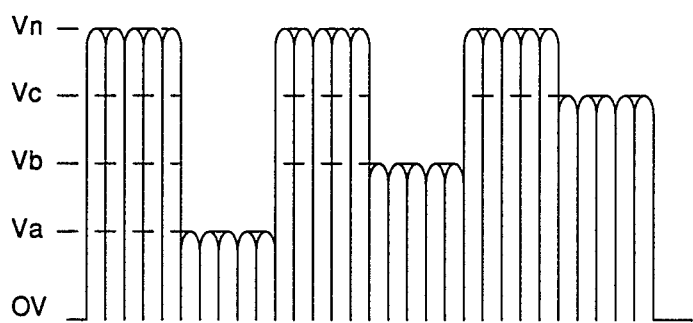

In FIG. 4 and 4C, the duty cycle pulses are matched in pulse repetition rate to the plate distance. In FIG. 4A and 4B, the frequency of the pulsed d.c. voltage is matched to the distance in wavelengths of the plate exciters. With the frequency of one of the set of pulses matched to the resonant wavelength, the frequency of the other set of pulses is varied to further control the electron leakage and/or to vary the rate of generation of the gasses.

Referring again to FIG. 6, attention is directed to the resonant cavity depicted therein pictorially. The resonant cavity would be the plate exciter of FIG. 1 or any other plate exciter wherein the frequency of the pulses of the applied voltage is matched in wavelength to the distance between the exciter plates The SCR diode is a duty cycle pulse former much in the same manner as the pulse former 27 of FIG. 1. The SCR diode 90 is operational in a conventional manner and the diode 91 is a conventional blocking diode. The operation and function of the resonant cavity is much in the same manner as that of FIG. 1 plate exciters 50a–50n.

In a Hydrogen Resonant Cavity Furnace, the pulse repetition rate is matched to the wavelength distance between the two exciter plates to maximize the rate of generation to voltage amplitude. The flame is pulsed form a first gradient level to a lower gradient level—but not off. The lower gradient level is sufficient to maintain at all times the amplitude to sustain resonance.

The waveform is shown in FIG. 4. The lower level amplitude Va is not OV the zero level; the amplitude level Va is sufficient to maintain resonance with a matched repetition rate of the duty cycle pulses.

In FIG. 6, the programmable switch circuit 79 is for variable inputs to a utilitarian device, such as the aforesaid furnace or the automobile hydrogen engine disclosed and claimed in my co-pending patent application Ser. No. 478,207. In the practical working embodiments the demand may be for hot water, heat, singly or together; and in the automobile the rate of acceleration; or simply the control of the flame size.

The increments of heat, acceleration, or flame size are controlled by the triacs 91, 92, 93, and 94, connected across the secondary winding and to taps on the secondary winding of the input transformer.

Synchronized with the voltage level control of the switching of the duty cycle pulse, is variable pulse circuit 97. The switch 95 provides the demand control to be programmed, that is, the voltage amplitude and the duty cycle pulses. The SCR switching circuit 90 converts the d.c. voltage pulse output of the rectifier 15 to duty pulses. The duty cycle pulse being variable in pulse repetition rate to match the distance in wavelength of the spacing of the plate exciters 86 and 87. Diode 98 is a blocking diode.

Although certain and specific embodiments have been shown the invention is not to be limited thereto. Significantly, the relatively small increase in voltage for a very appreciable gas generation upon resonance has extended applications to other uses of the hydrogen and oxygen gas generator. The control of the electron leakage is especially applicable to systems and processes wherein the potential is voltage dependant with no or little current.

I claim:

1. In a generator for producing a mixture of hydrogen and oxygen and other dissolved gas from natural water which generator includes at least a pair of plate exciters within a water containing vessel, a variable voltage source for applying a pulsating predetermined potential difference between the plates and wherein the rate of production of the mixture of gasses is controlled by varying at least one of the amplitude of the voltage and the pulse repetition rate of the pulsating potential difference applied to the plate exciters, and in which said variable voltage source includes a means for restricting the current flow between the plate exciters to a minimum value relative to a predetermined potential difference applied to the plates, the improvement in the means for restricting said current flow comprising: variable voltage source means for converting an input voltage potential to unipolar d.c. voltage pulses that are applied to the exciter plates and have a pulsating potential difference when measured from an arbitrary ground, said means further including means for regulating the voltage pulses in a repetitive frequency to inhibit the current flow caused by electron leakage between the plate exciters resulting from the amplitude of the applied voltage potential whereby said current flow is inhibited from exceeding a first minimum level.

2. The variable voltage source of claim 1 wherein said input voltage is an alternating current voltage and said circuit for converting said alternating current voltage to unipolar d.c. voltage pulses further comprises, means for varying the frequency of said alternating current voltage input to further inhibit electron leakage upon increasing the amplitude of the voltage applied to the plate exciters to a second level.

3. The variable voltage source of claim 1 wherein said input voltage is an alternating current voltage and said circuit for converting said alternating current voltage to unipolar d.c. voltage pulses further comprises, a transformer having primary and secondary windings, and a rectifier circuit connected across said secondary windings.

4. The variable voltage source of claim 1 wherein said input voltage is an alternating current voltage and said circuit for converting said alternating current voltage to a unipolar d.c. voltage pulses further comprises, a transformer having primary and secondary windings, and a rectifier circuit connected across said secondary windings; and wherein said transformer further includes variable inductive means for varying the output frequency of the voltage induced in said secondary winding to further inhibit electron leakage upon increasing the amplitude of the voltage applied to the plate exciters to a third level.

5. The variable voltage source of the generator of claim 1 further comprising a pulse forming circuit for varying the duty cycle of said unipolar d.c. voltage pulses to a predetermined repetition rate to inhibit electron leakage upon increasing the amplitude of the voltage applied to the plate exciters to a fourth level.

6. The variable voltage source of the generator of claim 5 wherein means are further provided to vary the amplitude of the duty cycle pulses to vary the rate of production of the hydrogen and oxygen gasses, further comprising means for correlating the repetition of said duty cycle pulses with the amplitude of said duty cycle pulses to provide an average amplitude pulse below the amplitude level causing electron leakage.

7. The variable voltage source of the generator of claim 5 wherein said varying of the duty cycle of said unipolar d.c. voltage pulses to inhibit electron leakage is a periodic varying.

8. The variable voltage source of the generator of claim 5 wherein said varying the duty cycle of said unipolar d.c. voltage pulses to inhibit electron leakage is an aperiodic varying.

9. The variable voltage source of the generator of claim 5 wherein said varying of the duty cycle of said unipolar d.c. voltage pulses to inhibit electron leakage comprise circuit means for varying the amplitude of said duty cycle pulses from a first gradient level to a second gradient level.

10. The variable voltage source of the generator of claim 5 wherein said varying of the duty cycle of said unipolar d.c. voltage pulses to inhibit electron leakage comprises circuit means for varying the duty cycle pulses to a plurality of distinctive gradient levels.

11. The variable voltage source of the generator of claim 5 wherein said varying of the duty cycle of said unipolar d.c. voltage pulses to inhibit electron leakage comprises circuit means for nonuniformly varying the duty cycle pulses to a plurality of distinctive gradient levels.

12. The variable voltage source of the generator of claim 5 wherein the frequency of said unipolar d.c. voltage pulses varied in duty cycle is non-repetitive.

13. The variable voltage source of the generator of claim 5 wherein said varying of the duty cycle of said pulses to inhibit electron leakage comprise circuit means for varying the amplitude from a first gradient minimum level to a plurality of gradient levels.

and wherein each or said gradient levels fo amplitude represent demand functions for a utilitarian device.

14. The variable voltage source of the generator of claim 1 wherein said input voltage is an alternating current voltage and said circuit for converting said alternating current voltage to a unipolar d.c. voltage pulses further comprises means for varying the frequency of said alternating voltage including a transformer having a primary winding and a secondary winding, and wherein said means is connected to the input of the primary of said transformer.

15. The variable voltage source of the generator of claim 1 wherein said pair of plate exciters are spatially positioned in said natural water with a physical distance therebetween of a wavelength to that of a particular frequency of the voltage back and forth motion between said exciter plates, and means for varying said unipolar d.c. voltage pulses in frequency to match the wavelength distance of said pair of plate exciters.

16. The variable voltage source of the generator of claim 1 wherein said pair of plate exciters are spatially positioned in said natural water with a physical distance therebetween of a wavelength to that of a particular frequency of the voltage back and forth motion between said exciter plates, and pulse forming means for varying the duty cycle of said unipolar d.c. voltage; and means for varying said duty cycle pulse in repetition rate to match the wavelength distance of said pair of plate exciters.

17. The variable voltage source of the generator of claim 1 wherein said pair of plate exciters are spatially positioned in said natural water with a physical distance therebetween of a wavelength to that of particular frequency of the voltage back and forth motion between said exciter plates, and pulse forming means for varying the duty cycle of said unipolar d.c. voltage ; and means for varying said duty cycle pulse in repetition rate to match the wavelength distance of said pair of plate exciters, and means for varying the amplitude of said duty cycle pulses to a minimum level to maintain resonance between said pair of plate exciters; and means for varying the repetition frequency of said unipolar d.c. voltage pulses to vary the rate of generation of gasses.

18. The variable voltage source of the generator of claim 1 wherein said pair of plate exciters are spatially positioned in said natural water with a physical distance therebetween of a wavelength to that of a particular frequency of the voltage back and forth motion between said exciter plates, means for varying said unipolar d.c. voltage pulses in frequency to match the wavelength distance of said pair of plate exciters, means for varying the amplitude of said unipolar d.c.voltage pulses to a minimum level to maintain resonance between said pair of plate exciters; and pulse forming means for varying the duty cycle of said unipolar d.c. voltage pulses, means for varying said duty cycle pulses in repetition rate to vary the rate of generation of gasses.

19. The variable voltage source of the generator of claim 1 wherein said pair of plate exciters are spatially positioned in said natural water with a physical distance therebetween of a wavelength to that of a particular frequency of the voltage back and forth motion between said exciter plates, pulse forming means for varying the duty cycle of said unipolar d.c. voltage in repetition rate to match the wavelength distance of said pair of plate exciters; and means for varying the amplitude of said duty cycle pulses from a first gradient minimum level to maintain resonance between said pair of plate exciters to a second gradient level.

20. The variable voltage source of the generator of claim 18 further comprising means for varying said duty cycle pulses to a plurality of distinctive gradient levels, and wherein the minimum amplitude level of said plurality is sufficient to maintain resonance between said pair of plate exciters.

21. The variable voltage source of the generator of claim 1 wherein said exciter plate having said negative voltage applied thereto further comprises a ground and an electron inhibiting resistive element connected between said negative plate and ground.

22. The variable voltage source of the generator of claim 1 wherein said exciter plate having said negative voltage applied thereto further comprises a ground and an electron inhibiting variable resistive element connected between said negative plate and ground, an means to vary said resistive element to maximize electron inhibition.

23. The variable voltage source of the generator of claim 1 wherein said exciter plate having said negative voltage applied thereto further comprises a pair of plates and a resistive material sandwiched therebetween, a ground and means for connecting said sandwich to ground to limit electron leakage.

24. The variable voltage source of the gnerator of claim 1 wherein said exciter plate having said negative voltage applied thereto further comprises a pair of plates and a resistive material sandwiched therebetween, said plates of poor conductive material, a ground and means for connecting said sandwich to ground.

25. The variable voltage source of the generator of claim 1 wherein said exciter plate having said negative voltage applied thereto further comprises a pair of plates and a resistive material sandwiched therebetween and wherein said resistive material comprises a resistive material and a binder, means for varying the percentage of binder to vary the resistance of said material, a ground and means for connecting said sandwich to ground to limit electron leakage.

26. The variable voltage source of the generator of claim 1 wherein said exciter plate having said negative voltage applied thereto further comprising a pair of plates and a resistive material sandwiched therebetween, a variable resistor, ground and means connecting said plate sandwich in series with said variable resistor to ground, and means for varying said variable resistance to minimize electron leakage to said negative plate.

27. The variable voltage source of the generator of claim 1 pair of plate exciter is a plurality of plate exciters, means for connecting said positive potential to each one of said said plates independantly and means for connecting said negative potential to each one of said other plates independantly, and means for connecting a resistive element between ground and each one of said plates having said negative voltage applied thereto.

28. The variable voltage source of the generator of claim 1 wherein said input voltage is a direct current voltage, means for converting said direct current voltage to unipolar d.c. voltage pulses comprising:

a rotating field comprising a primary winding and a secondary winding and wherein said direct current voltage is connected to said primary winding, a rectifier connected to said secondary winding of said rotating field.

29. The variable voltage source of the generator of claim 28 wherein said input voltage is a direct current and said secondary windings are a plurality of windings; and wherein the number of pulses at the output of said rectifier is equal to the number of windings.

30. The variable voltage source of the generator of claim 28 wherein the frequency of the voltage pulses induced in said secondary is dependant on the speed of rotation of said rotating field.

31. The variable voltage source of the generator of claim 28 wherein the amplitude of the voltage induced in the secondary is dependant on the number of turns in said secondary winding.

32. The variable voltage source of the generator of claim 28 further comprising a pulse forming circuit having said direct current voltage connected thereto and the output pulses connected to said primary to vary the duty cycle of said unipolar d.c. voltage pulses.

33. The variable voltage source of the generator of claim 1, the improvement in the said current limiting circuit comprising:

circuit component means for converting an input voltage to unipolar d.c. voltage pulses of a repetitive frequency to inhibit electron leakage upon varying the amplitude of the applied voltage above a first predetermined amplitude level, a pulse forming circuit for varying the duty cycle of said unipolar d.c. voltage pulses to a predetermined repetition rate to inhibit electron leakage upon varying the amplitude of the voltage beyond a second level of amplitude circuit means for varying the frequency of said unipolar d.c. voltage pulses to inhibit electron leakage upon varying the amplitude of the applied voltage above a third predetermined level, a ground and a variable resistive element connected between said plate exciter having said negative voltage applied thereto and ground to limit electron leakage upon varying the amplitude of the voltage beyond a fourth level of amplitude, a pair of plates and a resistive material sandwiched therebetween connected to said plate exciter having said negative voltage connected thereto and the end of said variable resistor opposite to the ground connection, to limit electron leakage upon varying the amplitude of said voltage applied to said plates bea fifth level.

34. The variable voltage source of the generator of claim 33 further comprising:
means for correlating the variation in amplitude of said voltage with the variation in the frequency of said unipolar duty cycle pulses.

35. The variable voltage source of the generator of claim 33 further comprising:
means for correlating the variation in amplitude of said voltage with the variation in the duty cycle pulses of the unipolar d.c. voltage pulses.

36. The variable voltage source of the generator of claim 33 wherein said pair of exciter plates are spatially positioned in said natural water with a physical distance therebetween of a wavelength to that of the particular frequency of motion,
means for varying said duty cycle pulses in repetition rate to match the wavelength distance of said pair of plate exciters,
means for varying the amplitude of said duty cycle pulses to a minimum level to maintain resonance between said pair of plate exciters,
means for varying the repetition frequency of said unipolar d.c. voltage pulses to vary the rate of generation of the gasses.

37. The variable voltage source of the generator of claim 33 wherein said pair of plate exciters are spatially positioned in said natural water with a physical distance therebetween of a wavelength to that of the particular frequency of motion,
means for varying the frequency of said unipolar d.c. voltage pulses to match the wavelength diatance of said pair of plate exciters,
means for varying the repetition rate of said duty cycle pulse to vary the rate of generation of gasses 38. The variable voltage source of the generator of claim 33 wherein said means for correlating the amplitude of said variation in amplitude with the repetition rate of said duty cycle pulses, further comprises varying the amplitude of said duty cycle pulses to distinctive amplitudes.

39. The variable voltage source of the generator of claim 33 wherein,
means for varying the spacing between said spatially positioned plate exciters to vary the rate of generation of the hydrogen and oxygen gasses.

40. The variable voltage source of the generator of claim 33 wherein,
means for varying the spacing between said spatially positioned plate exciters to vary the rate of generation of the hydrogen and oxygen gasses;
means for correlating the variation of said spacing of said exciters to the control of electron leakage between said plate exciters.

41. The variable voltage source of the generator of claim 33 wherein,
means for varying the spacing between said spacing of said exciters to match the distance between said plate exciters in wavelengths to a given pulse repetition rate.

* * * * *